United States Patent
Kein

(10) Patent No.: US 7,261,095 B2
(45) Date of Patent: Aug. 28, 2007

(54) METHOD FOR DETERMINING THE TEMPERATURE DOWNSTREAM THE ENTRY OF A CATALYTIC CONVERTER FOR A TURBOCHARGED ENGINE

(75) Inventor: Thibaut Kein, Toulouse (FR)

(73) Assignee: Siemens VDO Automotive, Toulouse Cedex (FR)

( * ) Notice: Subject to any disclaimer, the term of this patent is extended or adjusted under 35 U.S.C. 154(b) by 0 days.

(21) Appl. No.: 10/570,504

(22) PCT Filed: Aug. 18, 2004

(86) PCT No.: PCT/EP2004/009235

§ 371 (c)(1),
(2), (4) Date: Mar. 3, 2006

(87) PCT Pub. No.: WO2005/024198

PCT Pub. Date: Mar. 17, 2005

(65) Prior Publication Data

US 2006/0276955 A1    Dec. 7, 2006

(30) Foreign Application Priority Data

Sep. 5, 2003  (FR) .................................. 03 10516

(51) Int. Cl.
F02M 25/07 (2006.01)
G01L 3/26 (2006.01)

(52) U.S. Cl. ................................. 123/568.11; 73/117.2
(58) Field of Classification Search ........... 123/568.11, 123/568.12, 568.23, 568.24, 568.22; 73/117.2, 73/117.3, 118.1, 23.31, 25.01

See application file for complete search history.

(56) References Cited

U.S. PATENT DOCUMENTS

| 6,230,683 | B1 * | 5/2001 | zur Loye et al. ........... 123/435 |
| 6,276,334 | B1 * | 8/2001 | Flynn et al. ................. 123/435 |
| 6,286,482 | B1 * | 9/2001 | Flynn et al. ................. 123/435 |
| 6,314,735 | B1 | 11/2001 | Kolmanovsky et al. |
| 6,321,157 | B1 | 11/2001 | Cook et al. |

* cited by examiner

*Primary Examiner*—John T. Kwon
(74) *Attorney, Agent, or Firm*—Young & Thompson

(57) ABSTRACT

This method for determining, in a turbocharged engine, the temperature of the exhaust gases downstream of the turbine of the turbocharger, comprises the following steps:
  determining the temperature upstream of the turbine of the turbocharger,
  calculating a corrective term from engine operating parameters, and
  determining the temperature downstream of the turbine of the turbocharger by subtracting the corrective term from the temperature upstream of the turbine of the turbocharger.

3 Claims, 2 Drawing Sheets

Figure 1:
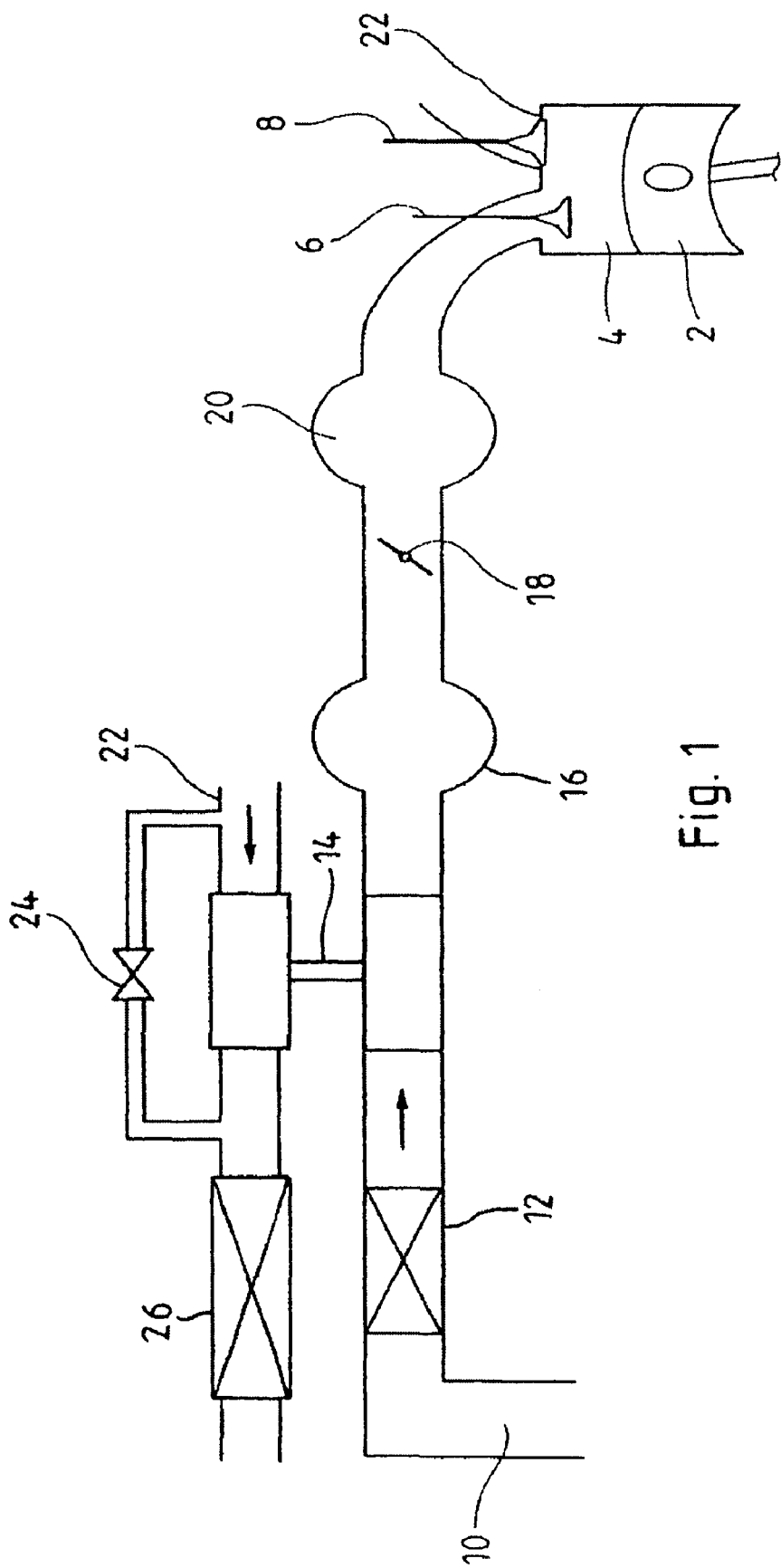

METHOD FOR DETERMINING THE TEMPERATURE DOWNSTREAM THE ENTRY OF A CATALYTIC CONVERTER FOR A TURBOCHARGED ENGINE

The present invention relates to a method for determining the temperature before the inlet to a catalytic converter of a turbocharged engine.

In an engine fitted with a catalytic converter it is important to know the temperature at the catalytic converter in order not to destroy the latter. This temperature is important for various functions: for protecting the catalyst and its upstream oxygen probe, for detecting that the upstream oxygen probe is ready, for heating the upstream oxygen probe and for heating the catalyst.

In some engines, these four functions, or at least some of them, do not exist. In other engines, these functions are regulated in open loop. It is also known for the control of these functions to take account of parameters that are not so precise as the temperature at the inlet to the catalytic converter.

In a normally-aspirated engine, it is known practice for the temperature at the inlet and at the outlet of the catalytic converter to be modeled. The temperature of the engine exhaust leaving the engine is also known by mapping.

The object of the present invention is therefore to provide a method that will enable the temperature at which the exhaust gases enter the catalytic converter, that is to say the temperature downstream of the turbocharger, to be determined reliably in a turbocharged engine fitted with a catalytic converter.

To this end, the invention proposes a method for determining, in a turbocharged engine, the temperature of the exhaust gases downstream of the turbine of the turbocharger, which comprises the following steps:
  determining the temperature upstream of the turbine of the turbocharger,
  calculating a corrective term from engine operating parameters, and
  determining the temperature downstream of the turbine of the turbocharger by subtracting the corrective term from the temperature upstream of the turbine of the turbocharger.

This is something which is very simple to determine but, as has been demonstrated, the temperatures determined using this method are temperatures that are more or less consistent with those recorded using a temperature probe in order to confirm this method.

The temperature upstream of the turbine of the turbocharger can be determined using a temperature probe but, in order to minimize the cost of the corresponding engine, it is preferably obtained by modeling. The person skilled in the art knows how to model this temperature and such modeling is already used to prevent the turbocharger from overheating. This modeling is, for example, done by an electronic device built into the engine control and management device. The corrective term can then advantageously be calculated by this same electronic device.

In a preferred embodiment, the corrective term is obtained first of all from a predetermined curve giving a temperature change as a function of the engine speed and of the mass air flow rate of air passing through the engine then by multiplying this temperature change by an adiabatic compression factor.

The adiabatic compression factor is advantageously dependent on at least one physical quantity chosen from the set comprising the engine exhaust pressure, the difference between this pressure and the external pressure and the opening of a waste gate of the turbocharger. In practice, just one quantity is sufficient to yield excellent results. In order then to define the three-dimensional curve that gives the temperature change dependent on the engine speed and on the mass air flow rate, this engine speed and the mass air flow rate are for example varied keeping the quantity/quantities on which the adiabatic compression factor is dependent constant.

The details and advantages of the present invention will become better apparent from the description which follows given with reference to the attached diagrammatic drawing in which:

FIG. 1 schematically depicts the architecture of a turbocharged engine, and

Figure 2:
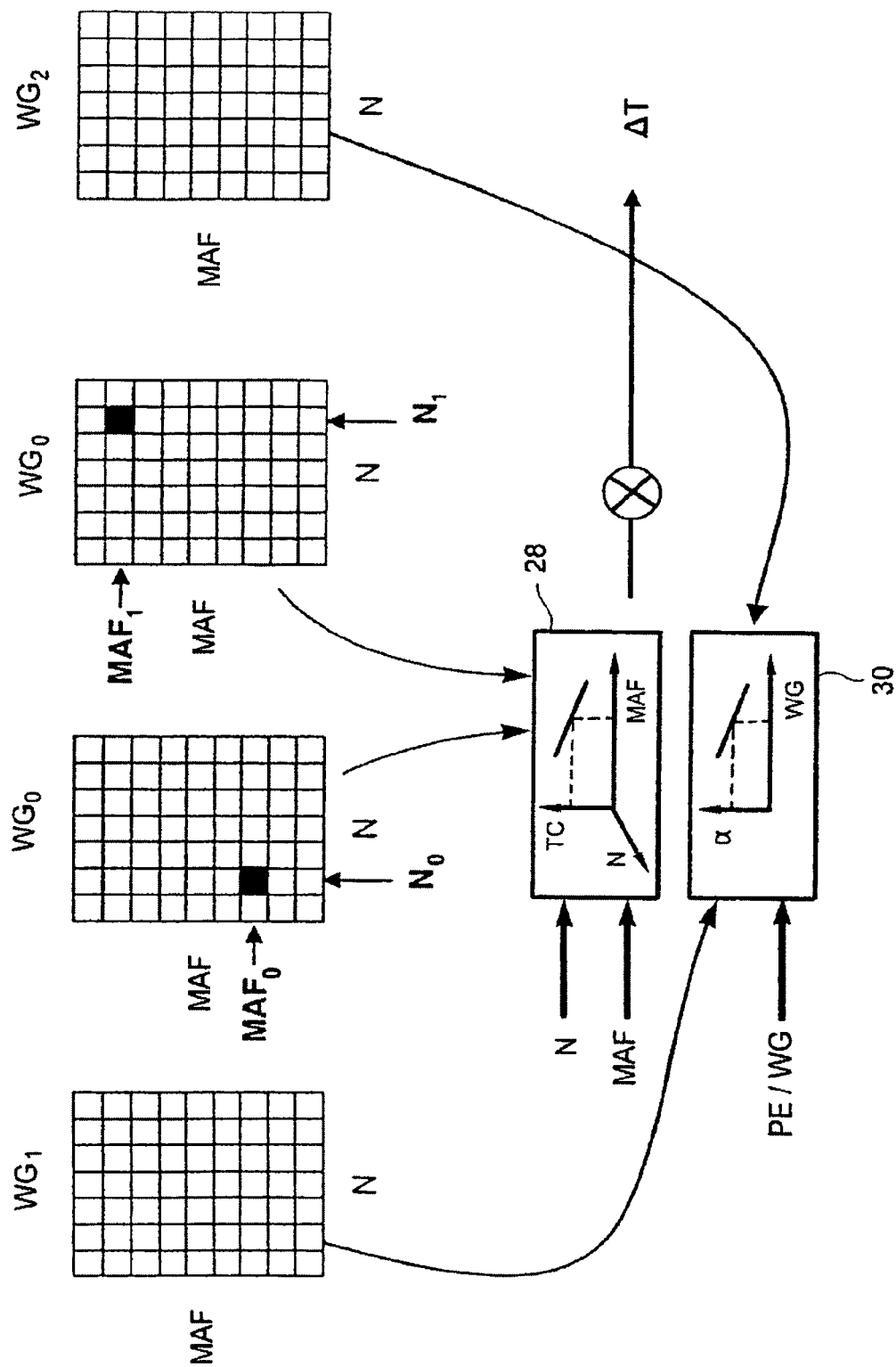

FIG. 2 is a diagram to explain the way in which the method according to the invention works.

FIG. 1 very diagrammatically depicts an air-supply and exhaust system for a turbocharged engine. This system supplies fresh air to an engine in which at least one piston 2 moves in a cylinder 4. The fresh air enters the cylinder 4 via an opening controlled by an inlet valve 6. A valve 8 is provided for exhausting the burnt gases from the cylinder 4.

The air supply system depicted comprises, from the upstream direction downstream, an air inlet 10, a mass air flow meter 12, a turbocharger 14, a chamber known as an intercooler 16, a butterfly valve 18 positioned in a pipe through which the air fed to the cylinders passes and able to alter the cross section for the flow of air through this pipe, and what is generally known as an inlet manifold 20. The inlet valves 6 are in direct communication with the inlet manifold 20.

The exhaust valves 8 are in direct communication with an exhaust pipe 22. In order not to clutter the drawing, this exhaust pipe 22 is depicted only where it leaves the cylinder and at the turbocharger 14. The latter comprises two turbines connected by a shaft. A first turbine is positioned in the exhaust pipe and its rotation is driven by the burnt gases leaving the cylinders 4 via the exhaust valves 8. The second turbine, as mentioned earlier, is positioned in the engine air supply system and pressurizes the air in the intercooler 16. In the conventional way, a turbocharger waste gate 24 allows the turbine positioned in the exhaust pipe 22 to be short-circuited.

On leaving the turbocharger, the exhaust gases pass through a catalytic converter 26 before being discharged to the open air.

The method described hereinbelow can be used to determine the temperature of the exhaust gases as they enter the catalytic converter 26. As mentioned in the preamble, knowledge of this temperature is important to the operation of the catalytic converter 26. This catalytic converter 26 contains an upstream oxygen probe (not depicted) which provides information to the engine management device in order to control the richness of the fuel/air mixture sent by the air supply system into the cylinders 4. Knowledge of the temperature upstream of the catalytic converter 26 and downstream of the turbocharger 14 allows the catalyst and the upstream oxygen probe to be protected from excessively high temperatures. When an excessively high temperature is detected, it is possible to alter the engine supply in order to reduce the temperature of the exhaust gases leaving the cylinders 4. It is also necessary, conversely, for the catalyst and the corresponding upstream oxygen probe to be at a relatively high temperature in order to be able to operate correctly. Knowledge of the temperature at the inlet to the catalytic converter 26 therefore makes it possible to determine whether the upstream oxygen probe is ready and therefore whether the information it is supplying should be taken into consideration. It is also possible to anticipate heating the upstream oxygen probe and the catalyst where their temperature is not high enough.

The person skilled in the art knows how, in a normally aspirated or turbocharged engine, to model the temperature in the exhaust pipe at the exit from the cylinders 4. Numerous parameters are used to determine this temperature, these including, for example, but without being exhaustive: the engine speed, the mass air flow rate, the richness of the fuel/air mixture sent to the cylinders, the ignition advance, etc.

The present invention proposes to calculate the temperature at the inlet to the catalytic converter 26, that is to say at the outlet from the turbocharger, from the (modeled) temperature upstream of the turbocharger. In order to do this, it proposes to extract from the basic map that determines the temperature before the turbocharger 14 a map dependent on the engine speed and on the mass air flow rate of air passing through the engine multiplied by an adiabatic compression factor dependent on a parameter such as the exhaust pressure and/or the opening of the turbocharger waste gate 24.

FIG. 2 illustrates a diagram explaining how the temperature downstream of the turbocharger 14 at the inlet to the catalytic converter 26 is determined according to the invention.

This FIG. 2 shows a three-dimensional curve depicted schematically in a first window 28. An orthogonal frame of reference is also depicted schematically in this window 28. The curve schematically depicted gives a temperature change TC determined from the engine speed N and from the mass air flow rate MAF measured by the flow meter 12. Thus, one axis of the frame of reference corresponds to the engine speed N, a second axis corresponds to the mass air flow rate MAF while the third axis indicates the value of the temperature change TC.

Under the window 28 there is a second window 30 in which are depicted a curve and a two-axis orthogonal frame of reference. The abscissa axis corresponds to one parameter while the ordinate axis corresponds to a multiplicative factor α. The parameter along the abscissa axis may be the exhaust pressure PE measured in the exhaust pipe 22 at the exit from the cylinders 4. It may equally be the pressure difference between this exhaust pressure PE and the atmospheric pressure outside the engine. It may finally be the opening (in degrees or as a percentage) of the turbocharger waste gate 24. This opening is termed WG in FIG. 2.

The temperature in the exhaust pipe 22 upstream of the catalytic converter 26 is considered to adopt the value $T_{upstream}$. Likewise, downstream of the turbocharger 14, the temperature adopts a value $T_{downstream}$. Thus $\Delta T = T_{upstream} - T_{downstream}$.

According to the present invention, it is considered that $\Delta T = \alpha \cdot TC$.

Hence: $T_{upstream} = T_{downstream} - \alpha \cdot TC$.

In order to produce the map depicted schematically in the window 28, the parameter of the window 30 (WG, PE, $P_{atm}$-PE) is kept constant. The engine speed and the mass air flow rate through the engine are then varied simultaneously in order to obtain a temperature change TC. FIG. 2 schematically depicts the construction of two points on the map of the window 28. These points yield the values $TC_0$ and $TC_1$ when the pair (MAF, N) adopts the values $(MAF_0, N_0)$ and $(MAF_1, N_1)$ respectively. The determined values $TC_0$ and $TC_1$ correspond to a turbocharger waste gate 24 opening corresponding to a value $WG_0$.

Once this map has been produced, the curve in the window 30 is produced. To do this, the value of the parameter WG is then varied. FIG. 2 schematically shows how to obtain two points on the curve in the window 30 with WG values of $WG_1$ and $WG_2$. This then yields coefficients $\alpha_1$ and $\alpha_2$ respectively.

In order thus in a turbocharged engine to determine the temperature at the inlet to the catalytic converter 26, the temperature upstream of the turbocharger 14 is first of all determined in the known way. This function is already known and carried out on certain engines. Then, as a function of the engine speed N and of the mass air flow rate MAF measured by the flow meter 12, the value TC needs to be determined. Likewise, according to the variable WG, PE or $P_{atm}$-PE chosen, the corresponding curve needs to be used to determine the corrective factor α. Multiplying the coefficient TC by α yields ΔT, the corrective term that can be used in order immediately to determine the value $T_{downstream}$.

This method has been validated on engines and quite accurately yields the temperature downstream of the turbocharger, at the inlet to the catalytic converter 26. It is therefore possible in this way to determine this temperature accurately without using a sensor. Furthermore, there is no need to employ additional electronic means in order to determine this temperature. When a vehicle is equipped with means for determining the temperature upstream of the turbocharger, these same means can determine the temperature downstream of this turbocharger using a method according to the invention. The additional cost associated with determining this temperature at the inlet to the catalytic converter 26 is therefore very low while at the same time affording great advantages as far as the life of the catalyst and of the upstream oxygen probe with which it is equipped is concerned.

In order to further illustrate the advantage afforded by determining the temperature at the inlet to the catalytic converter 26, a numerical example is given below. It is generally considered that the inlet temperature of exhaust gases entering the turbocharger must not exceed about 1000° C. As far as the upstream oxygen probe is concerned, it is preferable for its temperatures not to exceed around 750° C. When temperatures close to 1000° C. are obtained upstream of the exhaust turbine of the turbocharger 14, for example temperatures of 950° C., temperatures that may be as high as 850° C. are found downstream of the turbocharger. When the oxygen probe is close to the turbocharger turbine, it is then necessary to instigate an enriching (with fuel) of the mixture burnt in order to lower the temperature at the inlet to the catalytic converter 26. In engines of the prior art, no enrichment in order to protect the turbine is performed because the limiting value of 1000° C. is not achieved.

The present invention is not restricted to the embodiment of the method that has been described hereinabove by way of nonlimiting example. It also relates to all embodiment variants within the competence of those skilled in the art within the scope of the claims that follow.

The invention claimed is:

1. A method for modeling the exhaust gas temperatures in a turbocharged engine downstream of the turbine of the turbocharger (14), comprising the following steps:
determining the temperature upstream of the turbine of the turbocharger (14), calculating a corrective term from engine operating parameters, and determining the temperature downstream of the turbine of the turbocharger (14) by subtracting the corrective term from the temperature upstream of the turbine of the turbocharger (14), characterized in that the corrective term is obtained first of all from a predetermined curve giving a temperature change (TC) as a function of the engine speed (N) and of the mass air flow rate (MAF) of air passing through the engine then by multiplying this temperature change (TC) by an adiabatic compression factor ($\alpha$).

2. The method as claimed in claim 1, characterized in that the adiabatic compression factor ($\alpha$) is dependent on at least one physical quantity chosen from the set comprising the engine exhaust pressure (PE), the difference between this pressure and the external pressure and the opening (WG) of a waste gate of the turbocharger (24).

3. The method as claimed in claim 2, characterized in that, in order to define the three-dimensional curve that gives the temperature change dependent on the engine speed (N) and on the mass air flow rate (MAF), this engine speed (N) and the mass air flow rate (MAF) are varied keeping the quantity/quantities on which the adiabatic compression factor ($\alpha$) is dependent constant.

* * * * *